United States Patent Office 3,545,262
Patented Dec. 8, 1970

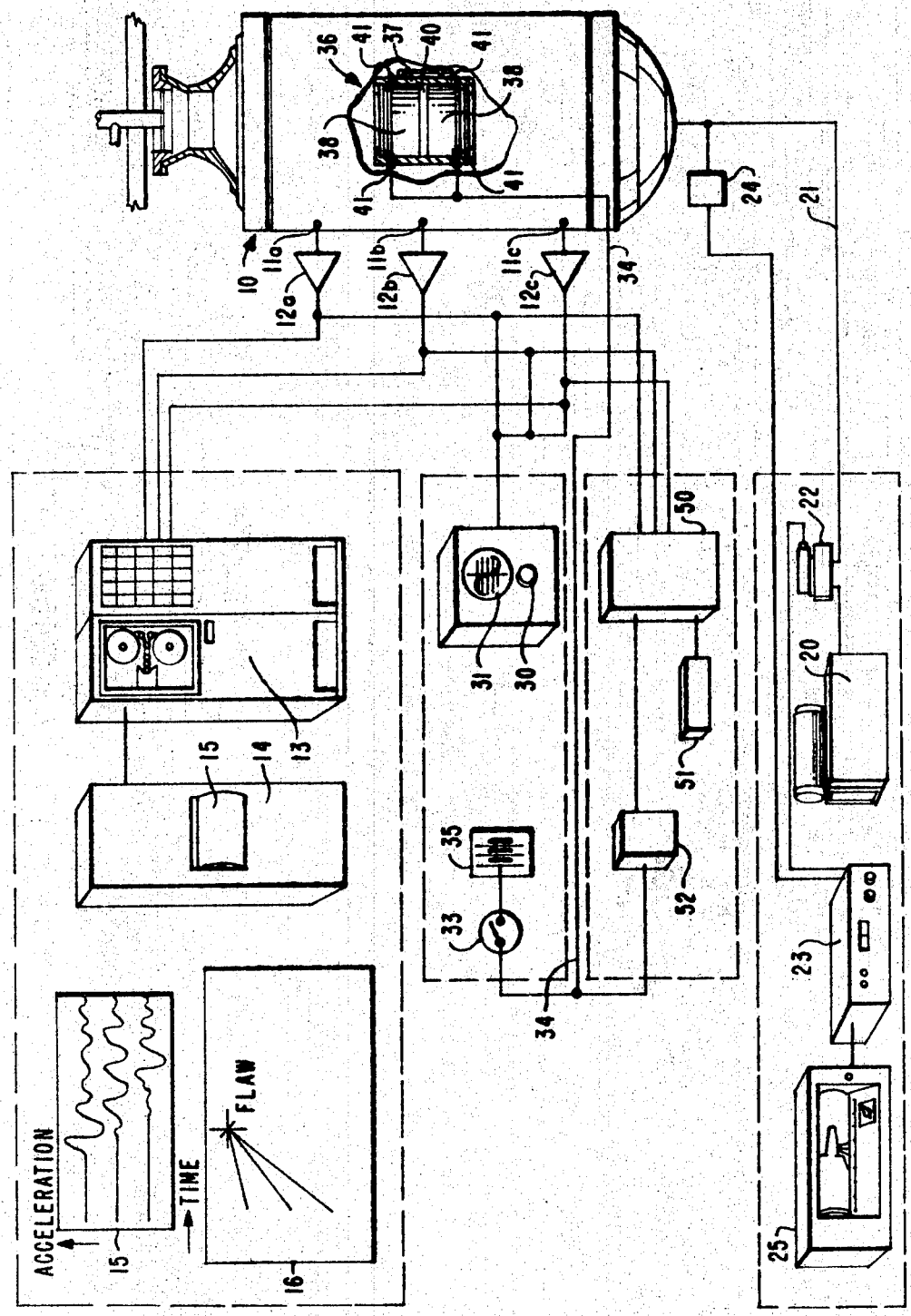

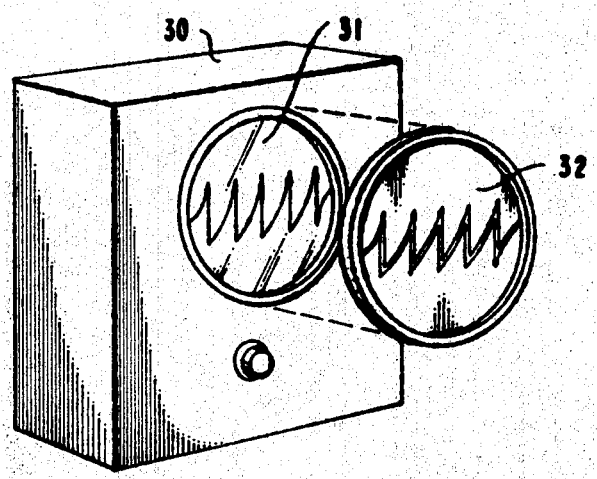
FIG.—2
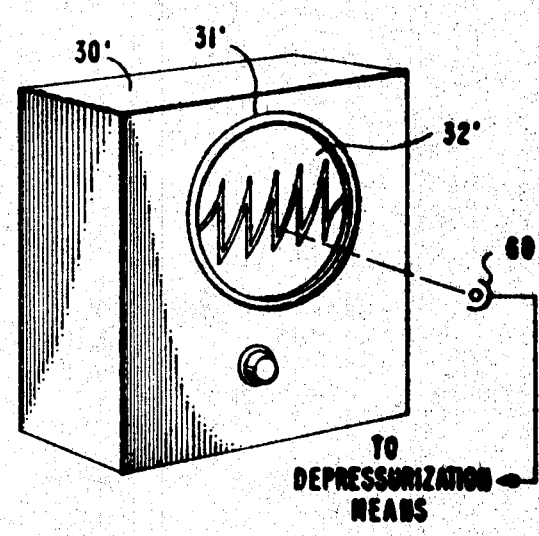
FIG.—3

3,545,262
METHOD AND APPARATUS FOR NONDESTRUCTIVE TESTING OF PRESSURE VESSELS
Richard K. Steele, Carmichael, and Allen T. Green and Charles S. Lockman, Sacramento, Calif., assignors to Aerojet-General Corporation, El Monte, Calif., a corporation of Ohio
Filed May 9, 1967, Ser. No. 637,249
Int. Cl. G01n 3/12
U.S. Cl. 73—88.5                    12 Claims

ABSTRACT OF THE DISCLOSURE

This disclosure concerns a method and apparatus for nondestructively testing pressure vessels to detect the presence and location of any flaws in the walls thereof. In practicing the method, a plurality of stress-wave sensors, such as accelerometers, for example, are attached to the external surface of a pressure vessel in spaced relationship with respect to each other so as to be arranged over a substantial portion of the pressure vessel. Pressure fluid is then introduced into the pressure vessel to continually increase the internal pressure therewithin. If a flaw is present in a wall of the pressure vessel, the extension of the flaw under load by the continually increasing internal pressure propagates a stress wave which is detected by the plurality of stress-wave sensors. The flaw-propagated stress wave travels through the wall of the pressure vessel at the velocity of sound in the material of which the wall of the pressure vessel is made. Signals are emitted by the stress-wave sensors as the stress wave arives at various sensor locations, and the location of the flaw in the wall of the pressure vessel is determined by a triangulation technique which relies upon the time differences as to the arrival of the stress wave at various sensor locations.

For each particular pressure vessel whose wall structure is made of a given material, a critical stress-wave signature is inscribed in a translucent template which may be overlaid on an osclloscope to permit an operator to visually observe when the pressure vessel undergoing testing has been internally pressurized to the danger point, whereupon the operator manually actuates a mechanism relieving the internal pressure within the pressure vessel. Alternately, the critical stress-wave signature of the pressure vessel is inscribed on an opaque template attached to an oscilloscope such that coincidence between the signal level received by the oscilloscope and the critical stress-wave signature etched in the template will be detected by a photocell which automatically actuates the mechanism for relieving the internal pressure of the pressure vessel undergoing testing.

BACKGROUND OF THE INVENTION

This invention generally relates to the testing of structures for detection and location of flaws therein, wherein stress waves propagated by the extension of a structural flaw placed under a gradually increasing load are detected by appropriately arrayed sensors attached to the structure such that signals emitted by the sensors are indicative of the detection of the flaw and its location in the structure. More particularly, the present invention pertains to an improved method and apparatus for nondestructively testing pressure vessels to determine the existence and location of flaws in the walls thereof, wherein pressure fluid is continually introduced into the pressure vessel to increase the internal pressure therewithin so as to provide a driving potential to any structural flaws therein to propagate stress waves from such flaws. The stress waves propagated by structural flaws are detected in such a manner as to locate the origin of the flaw in a wall of the pressure vessel. Whenever stress waves approaching a predetermined critical amplitude are developed in the walls of a pressure vessel, the internal pressure within the pressure vessel is relieved either manually or automatically, thereby avoiding rupture of the walls of the pressure vessel.

Heretofore, the development of suitable methods for nondestructively testing structures as to various physical strengths and weaknesses has been long recognized as a worthwhile goal to prevent destruction of the structure being tested which is often accompanied by other damage to testing equipment and/or nearby structures, equipment, etc. and injury to personnel. Destruction of the structure being tested also frequently results in the reason for its failure being unknown. To this end, one such nondestructive test procedure for testing a pressure vessel is disclosed in U.S. Pat. 2,754,677 issued to John C. New on July 17, 1956. This test procedure employs a differential pressure principle for determining the incipient buckling pressure of the vessel when it is subjected to external pressure and is limited in its application, since the thin shell or vessel to be tested must be disposed within a larger chamber filled with liquid in order to impose a regulated external pressure on the thin shell. The method involves filling the shell with liquid and continuously increasing the external pressure applied to the thin shell while comparing the external pressure with the internal pressure of the shell until the pressure differential therebetween is essentially constant which determines the point of incipient buckling of the thin shell. However, this test procedure merely determines the degree of external pressure to which the thin shell pressure vessel may be subjected without collapse and does not detect or indicate the location of flaws in the pressure vessel.

Another non-destructive testing method is described in U.S. Pat. 3,113,451 issued to Beals, Jr., et al., on Dec. 10, 1963. This latter method involves testing to determine the operational reliability of structural elements, particularly airframe structures, wherein vibration-inducing devices are attached to various surfaces of the structure being tested and vibration-transducer devices are attached to the structure in generally opposed relation to the vibration-inducing devices so as to detect vibrations in the structure being tested following actuation of the vibration-inducing devices, thereby giving off signals which are indicative of the vibrations occurring in the structure being tested. This method relies upon the artificial inducement of vibration in the structure being tested and is therefore more or less limited to the testing of structures which will undergo a significant degree of vibration while in operation. It does not purport to detect or locate structural flaws in the structural element which is tested in accordance therewith.

SUMMARY OF THE INVENTION

The present invention concerns an improved method and apparatus for the nondestructive testing of structures, in particular pressure vessels, to detect and locate the presence of structural flaws therein before environmental conditions become so severe as to cause the destruction of the structure being tested. The method relies upon the principle of stress wave propagation by a structural flaw when placed under a load which follows an acoustical law in that such stress waves travel through the material of the structure at the velocity of sound in such media. A plurality of stress-wave sensors, such as accelerometers, for example, are attached to the structure being tested at various spaced locations thereon so as to be arranged over a substantial portion of the structure.

The stress waves emanating from a structural flow placed under a load arrive at the various sensor locations at different times such that signals given off by the respective sensors are indicative of the time differential of stress-wave arrival at the respective sensor locations. This signal information is transmitted to an appropriate analyzer device which interprets the signal information to determine the location of the structural flaw of the structure by a procedure known as a triangulation technique. Thus, detection and location of a structural flaw in the structure are accomplished.

When employed in conjunction with the testing of a pressure vessel, the present method and apparatus includes a manually-operated or automatically-operated control system to relieve the internal pressure within the pressure vessel whenever stress waves generated by flaws in the walls thereof placed under load by the internal pressure wave approach a critical amplitude indicating the likelihood of rupture of the pressure vessel wall should the internal pressure of the vessel be increased. In this connection, the method acording to this invention contemplates the introduction of pressure fluid into the pressure vessel being tested to continually increase the internal pressure thereof. This increase in the internal pressure of the pressure vessel increases the driving potential on any structural flaws in the walls of the pressure vessel for propagating stress waves of changing character, such structural flaws being sensed and located in the manner previously described.

A critical stress-wave signature is derived for the particular type of pressure vessel being tests, depending upon the material of the pressure vessel walls, the thickness of such walls, and other related factors—this critical stress-wave signature comprising a sequence of stress waves having an amplitude which is indicative of impending failure of the pressure vessel. This critical stress-wave signature is transcribed on a template which is attached to the viewing screen of as oscilloscope.

Manual depressurization of the pressure vessel prior to the failure thereof is thereafter accomplished by an operator when he visually observes coincidence between the critical stress-wave signature transcribed in the template and the actual stress-wave signals received and displayed on the viewing screen of the oscilloscope. When such coincidence occurs, the operator actuates a control system for relieving the internal pressure within the pressure vessel.

Alternatively, depressurization of the pressure vessel prior to the failure thereof may be accomplished automatically. In one form of this embodiment of the invention, an opaque template having the critical stress-wave signature of the pressure vessel transcribed therein is attached to the viewing screen of the oscilloscope in such a manner as to completely exclude outside light. A photocell is aligned with the viewing screen of the oscilloscope and when coincidence occurs between the actual stress-wave signals received on the viewing screen of the oscilloscope and the critical stress-wave signature etched in the opaque template, light from the oscilloscope viewing screen will be transmitted through the etched portion of the template to be detected by the photocell for automatically actuating the control system for relieving the internal pressure within the pressure vessel. Thus, the present method and apparatus provide for the detection and location of structural flaws in a structure, in particular a pressure vessel, and further indicate the degree of internal pressure to which the pressure vessel may be subjected without failure—such testing being accomplished without destruction of the structure being tested.

BRIEF DESCRIPTION OF THE DRAWING

In the drawings:

FIG. 1 is a schematic view showing the apparatus employed in practicing the method of nondestructively testing a pressure vessel for structural flaws in accordance with the present invention;

FIG. 2 is an exploded perspective view showing a visual control for preventing failure of the pressure vessel being tested; and FIG. 3 is a perspective view, partially diagrammatic in form, showing an alternate embodiment of FIG. 2, wherein an automatic control for preventing failure of the pressure vessel being tested is provided.

DETAILED DESCRIPTION

Referring more specifically to the drawings, the method and apparatus according to the present invention are shown in conjunction with the testing of the housing 10 of a rocket motor, although it will be understood that the method and apparatus are applicable in the nondestructive testing pressure vessels generally with respect to determining the existence and location of structural flaws occurring in the walls thereof. The present invention is predicated on an acoustic principle, wherein it has been discovered that structural flaws in a structure, such as the wall of a pressure vessel, will propagate stress waves traveling through the material of the wall at the velocity of sound in such media when such flaws are placed under a load. To this end, a plurality of stress-wave sensors are secured to the external surface of the pressure vessel 10 in a predetermined spaced relationship with respect to each other so as to be arranged over a substantial portion of the external surface of the pressure vessel 10 being tested. In FIGS. 1 and 2, three such stress-wave sensors 11a, 11b, and 11c are shown in mounted relation on the external surface of the pressure vessel 10. It will be understood that a greater number of stress-wave sensors may be mounted on the pressure vessel 10, as the three sensors 11a, 11b, 11c shown are for purposes of illustration only. These stress-wave sensors may take the form of accelerometers, crystals, or strain gauges capable of detecting the existence of stress waves in the wall of the pressure vessel 10 to which they are secured. For purposes of example, the stress-wave sensors, 11a, 11b, 11c are preferably accelerometers. An accelerometer is a mechanical to electrical transducer which provides an electrical signal or output proportional to the mechanical acceleration occurring along the plane in which the accelerometer is located. The plurality of accelerometers 11a, 11b, 11c are so positioned on the external surface of the pressure vessel 10 in spaced relationship with respect to each other as to detect any stress waves being transmitted through the walls of the pressure vessel 10. In this connection, it has been determined that structural flaws in a structure when subjected to a load will propagate stress waves which travel through the material of the structure at the velocity of sound in such media.

Accordingly, whenever the accelerometers 11a, 11b, 11c detect such a stress wave being transmitted through the walls of the pressure vessel 10, these accelerometers generate a transient electrical output signal. This electrical signal comprises high frequency components having an amplitude dependent upon the amount of energy released by the structural flaw which is contingent upon the degree to which extension of the structural flaw has occurred because of the load imposed thereon. The times at which the transient electrical output signals emitted by the accelerometers 11a, 11b, and 11c occur are directly proportional to the difference in the respective distances from the structural flaw of each accelerometer 11a, 11b, 11c. Thus, the electrical signals given off by the respective accelerometers 11a, 11b, 11c are indicative of the time differential of stress-wave arrival at the respective accelerometer locations.

Preferably, these electrical signals given off by the accelerometers 11a, 11b, and 11c in response to their detection of a stress wave transmitted by a structural flaw through the walls of the pressure vessel 10 are amplified by respective amplifiers 12a, 12b, and 12c before being fed into a recorder 13 in order to make a permanent record of the test data provided by the electrical signals given off by the accelerometers 11a, 11b, and 11c. The recorder 13 may be of the magnetic tape type, wherein the test data represented by the electrical signals is transcribed on magnetic tape. Such test data is also preferably fed into a second recorder of the type providing a visual written record of the electrical signals given off by the accelerometers 11a, 11b, 11c. This second recorder 14 preferably comprises a recording oscillograph which provides a written record 15 tracing the respective electrical signals received from each of the accelerometers and plotting acceleration versus time so as to obtain the respective time differentials of the stress-wave arrival at the respective locations of the accelerometers 11a, 11b, and 11c.

Since the stress waves being detected by the accelerometers 11a, 11b, and 11c will travel through the walls of the pressure vessel 10 at the velocity of sound in the particular material from which the walls of the pressure vessel 10 are constructed, knowledge of this velocity of the stress waves coupled with the difference in time as to the arrival of each stress wave at the locations of the individual accelerometers 11a, 11b, and 11c can be utilized to determine the origin of the stress wave or the location of the structural flaw in the walls of the pressure vessel 10.

This determination of the origin of the stress wave is accomplished by a so-called triangulation technique which comprises a computational process performable either manually or by a suitably programmed computer and is illustrated diagrammatically, being identified by reference numeral 16 in FIG. 1. With the knowledge imparted by the test data derived from the electric signals given off by the accelerometers 11a, 11b, and 11c as exemplified by the written record 15, plus knowing the velocity of sound in the particular material from which the pressure vessel 10 is constructed, the origin of the stress wave or the location of the structural flaw in the walls of the pressure vessel 10 can be mathematically determined using a standard graphical technique generally referred to as "triangulation." Alternatively, upon providing to a suitably programmed computer the necessary test data derived from the electric signals given off by the accelerometers 11a, 11b, and 11c, plus the velocity of sound in the particular material from which the pressure vessel 10 is constructed, the computer is able to establish the location of the structural flaw by determining the origin of the stress wave detected by the accelerometers 11a, 11b, and 11c. Thus, the detection of a structural flaw in the walls of a pressure vessel 10 is accomplished by the accelerometers 11a, 11b, and 11c, and the location of the structural flaw or the origin of the stress waves propagated therefrom is determined by the triangulation technique as described. It will therefore be understood that the present method and apparatus are applicable in the testing of any general structure for the detection and location of structural flaws therein. In this respect, the structure to be tested is subjected to a gradually increasing load, such as the application of a gradually increasing tensile stress to an elongated bar, for example, which acts as a driving medium on any structural flaw in the bar causing stress waves of changing character to be propagated from the flaw. Sensors located on the bar detect these stress waves which in turn provide information enabling the location of any structural flaw in the bar to be accurately determined.

As applied to the non-destructive testing of a pressure vessel, the present method and apparatus contemplates the introduction of pressure fluid into the pressure vessel 10 so as to increase the internal pressure therewithin. Increasing the internal pressure of the pressure vessel 10 imposes an increasing load on the walls of the pressure vessel 10 and thereby acts as a driving means tending to extend any structural flaw in the walls of the pressure vessel 10. In this manner, the increasing internal pressure within the pressure vessel 10 by causing flaw extension results in a greater amount of energy being released by the flaw in the form of stress waves with increased amplitude and/or frequency.

Thus, the present method is capable of testing a pressure vessel 10 as to its capacity for withstanding an internal pressure of a predetermined magnitude in a quality control testing procedure. To this end, means are provided for introducing pressure fluid into the interior of the pressure vessel 10 at a controlled continuous rate. By way of example, such means may take the form of a pump 20 communicating with the interior of the pressure vessel 10 through a pressure line or conduit 21 in which a control valve 22 is interposed for the purpose of regulating the flow pressure fluid from the pump 20 into the pressure vessel 10 through the conduit 21. Opening and closing of the valve 22 may be regulated by a pressure controller or regulator 23 which senses the fluid pressure in the conduit 21 and may be adjustably set to operate the valve 22 for opening and closing the valve 22 as required to regulate the fluid pressure in the conduit 21.

In a preferred form of the invention, hydraulic fluid is utilized to internally pressurize the pressure vessel 10, such hydraulic fluid being pumped thereinto through the conduit 21 by the pump 20 which is of a suitable hydraulic type. However, it will be understood that the pressure vessel 10 could be internally pressurized by gaseous fluid within the spirit of the invention.

In order to monitor the pressure in the conduit 21 and within the pressure vessel 10, a pressure transducer 24 is preferably connected to the conduit 21 at a location thereon adjacent to the pressure vessel 10, the pressure transducer 24 sensing the fluid pressure in the conduit 21 at this location and transmitting an electrical signal indicative of the magnitude of the fluid pressure at this location in the conduit 21 back to the pressure controller or regulator 23, which, in turn, actuates the control valve 22 as necessary to increase or decrease the pressure fluid passing through the valve 22 in the conduit 21. A programmer unit 25 is preferably connected to the pressure controller or regulator 23 to progressively change the adjustment thereof providing for a predetermined rate of increase in the pressure setting of the control valve 22 so as to gradually increase the fluid pressure in the conduit 21 in accordance with a planned gradual increase in the internal pressure of the vessel 10 over a predetermined time period. To this end, the programmer unit 25 may be of the type having a revolving drum provided with a record incorporating signal information thereon concerning the rate of pressure increase per unit time. As the drum revolves, a stylus or other transmitter traces along the record sensing signal information to the pressure controller or regulator 23 for changing the setting thereof accordingly so as to reflect the planned rate of increase of the internal pressure of the vessel 10.

Upon continually increasing the internal pressure within the pressure vessel 10, a structural flaw in the walls thereof will undergo extension (growth) so as to propagate stress waves having increased amplitudes and frequencies. It will be apparent that an uncontrolled increase in the internal pressure within the pressure vessel 10 will eventually result in the destruction in the pressure vessel 10 by rupture of the walls thereof whenever the internal pressure exceeds a magnitude which the walls of the pressure vessel 11 are capable of sustaining. The present method and apparatus therefore provide for depressurization of the internal pressure within the pressure vessel 10 whenever the internal pressure reaches a predetermined magnitude above which the walls of the pressure vessel 10 are likely to rupture. In this respect, the present method and apparatus contemplate the use of a critical stress-wave signature comprising the number and amplitude of stress waves which are indicative of impending pressure vessel failure. The critical stress-wave signature is determined in advance for each type of pressure vessel being tested, depending upon factors such as the material of the pressure vessel walls, the thickness of the walls, the internal pressure to which the pressure vessel is designed to be subjected, temperature, and other related factors. In some cases, especially where the material of the pressure vessel walls is heterogeneous (e.g. resin-impregnated filament windings) rather than homogeneous (e.g. metal), this advance determination requires initial testing of each type of pressure vessel under such conditions where the walls of the pressure vessel are deliberately ruptured. Test data is obtained showing the stress wave pattern 15 at the point of failure of the pressure vessel and at respective time increments immediately prior to such failure. From such test data, a critical stress-wave signature showing the number and amplitude of stress waves indicative of impending failure for a particular type of pressure vessel can be obtained such that the same type of pressure vessel can be thereafter nondestructively tested by using the information imparted by the critical stress-wave signature as will be described hereinafter.

Relieving the internal pressure of the pressure vessel 10 decreases or limits the stress field which provides the driving potential for the propagation of stress waves from the structural flaw in the walls of the pressure vessel 10, thereby arresting extension of the structural flaw and preventing failure of the pressure vessel, provided the reduction in the internal pressure of the pressure vessel 10 is timely accomplished. By depressurizing the pressure vessel 10 whenever the electrical signals emitted by the accelerometers 11a, 11b, and 11c approach a predetermined condition corresponding to the critical stress-wave signature for the pressure vessel 10, extension of any structural flaws can be halted short of pressure vessel failure.

In accordance with the preent method and apparatus, depressurizing the pressure vessel 10 or relieving the internal pressure thereof may be accomplished either manually or automatically. In manually depressurizing the pressure vessel 10 to prevent failure thereof, an oscilloscope 30 with a viewing screen 31 is electrically connected into the respective amplifiers 12a, 12b and 12c of the accelerometers 11a, 11b, and 11c so as to provide a visual display of the electrical signals emitted by the accelerometers 11a, 11b, 11c on the screen 31 from the cathode ray tube of the oscilloscope 30. The critical stress-wave signature for the particular pressure vessel 10, which is obtained in advance as previously described, is transcribed on a template 32 which is attached to the viewing screen 31 of the oscilloscope 30. Alternatively, a translucent painting of the critical stress-wave signature may be applied to the viewing screen 31 of the oscilloscope 30. Manual depressurization of the pressure vessel 10 requires the attention of an operator to the viewing screen 31 of the oscilloscope 30. Whenever the operator visually observes coincidence between the critical stress-wave signature transcribed on the template 32 and the actual electrical signals displayed on the screen 31 of the oscilloscope 30, the operator actuates a device for relieving the internal pressure of the pressure vessel 10 or depressurizing the presure vessel 10 to arrest the growth of any structural flaws in the walls of the pressure vessel 10 before failure thereof.

As shown, the operator effects manual depressurization of the pressure vessel 10 by closing a manually-operable switch 33 connected into an electrical line 34 extending between an electrical power supply 35 and an electrically operable pressure-relieving means or depressurization means 36 disposed within the interior of the pressure vessel 10. The pressure-relieving means 36 could take any suitable form, such as an electrically actuated solenoid pressure relief valve, which upon being opened would permit pressure fluid to be drained from the pressure vessel 10 through a discharge line (not shown). For purposes of illustration, the pressure-relieving means 36 as shown in FIG. 1 comprises a cylinder 37 disposed within the interior of the pressure vessel 10 in which a pair of pistons 38, 38 are received. The pistons, 38, 38 are spaced apart within the cylinder 37 so as to provide a central void 40 disposed in the cylinder 37. Normally, the pistons 38, 38 are restrained against axial movement inwardly of the cylinder 37 by respective shear pins 41 which fixedly secure the pistons 38, 38 to the cylinder 37. The shear pins 41 may be of explosive type, such that upon receiving electrical energy the pins 41 will explode, thereby releasing the pistons 38, 38. When the pistons 38, 38 are released by the explosion of the shear pins 41, the internal pressure within the pressure vessel 10 acts on the respective surfaces thereof which are exposed to the internal pressure to move the pistons 38, 38 toward each other for occupying the central void 40 defined in the cylinder 37. This causes an increase in the effective volume within the pressure vessel 20 which may be occupied by the pressure fluid disposed therein so as to reduce the internal pressure of the pressure vessel 10.

As earlier described, depressurizing or relieving the internal pressure of the pressure vessel 10 may also be accomplished automatically in accordance with the method and apparatus comprising the present invention. In one embodiment, automatic depressurization of the pressure vessel 10 occurs whenever coincidence with a pre-set critical stress-wave signature is obtained from the electrical signals received from the accelerometers 11a, 11b, and 11c in response to stress waves propagated by a structural flaw. In this connection, test data equivalent to the critical stress-wave signature is fed into a frequency and amplitude discriminator or comparator 50 which is powered by a suitable power supply 51. Should the signals received from the accelerometers 11a, 11b, and 11c by the discriminator or comparator 50 coincide with or exceed the pre-set test data therein corresponding to the critical stress-wave signature, the discriminator or comparator 50 triggers an electronic switch 52 to automatically actuate the pressure-relieving means 36 associated with the pressure vessel 10 so as to reduce the internal pressure thereof. The frequency and amplitude discriminator or comparator 50 comprises computer which may also be employed in establishing the location of any structural flaws in the walls of the pressure vessel 10 by the previously described triangulation technique associated with reference numeral 16. In this respect, the computer 50 in addition to being programmed to detect coincidence between critical signal data stored in its memory system and the actual signals received from the accelerometers 11a, 11b, and 11c and initiating a signal closing the electronic switch 52 to depressurize the pressure vessel 10 when such coincidence occurs, may also be programmed to perform the mathematical computations required to establish the location of any structural flaws in the walls of the pressure vessel 10. Where the computer 50 serves this additional function, it is equipped with an appropriate readout giving sufficient written information to advise personnel as to the locations of any structural flaws in the walls of the pressure vessel 10.

It will be understood that either of the manual depressurizing system and the automatic depressurizing system which have already been described may be employed alone in depressurizing the pressure vessel 10 to prevent failure thereof, or both depressurizing systems may be employed at the same time, as illustrated in FIG. 1. In the latter instance, the automatic depressurizing system serves as an overriding safety factor for the manual depressurizing system and vice versa to respectively reduce the possibility of "human error" or mechanical/electrical failure which could allow the internal pressure of the pressure vessel 10 to be increased to a dangerous degree. Preferably, the closing of either switch 33 or 52 also causes the pump 20 to be shut down so as to stop the further discharge of pressure fluid therefrom into the pressure vessel 10 through the conduit 21.

Another form of automatic depressurizing system for relieving the internal pressure of the pressure vessel 10 is illustrated in FIG. 3, this form of the automatic depressurizing system being generally similar to the manual depressurizing system previously discussed. In this connection, the critical stress-wave signature for the particular pressure vessel 10 being tested is etched or transcribed in an opaque template 32' which is attached to the viewing screen 31' of an oscilloscope 30'. The template 32' with the critical stress-wave signature etched therein is disposed over the viewing screen 31' of the oscilloscope 30' in such a way as to completely exclude any outside light. A photoelectric cell 60 is disposed in alignment with the viewing screen 31' of the oscilloscope 30' so as to be capable of detecting coincidence between the actual electrical signals displayed on the screen 31' of the oscilloscope 30' and the critical stress-wave signature in the template 32'. When such coincidence occurs, the photoelectric cell 60 automatically detects such coincidence and closes an electronic switch, such as switch 52, to actuate the pressure-relieving means 36 associated with the pressure vessel 10.

It will therefore be seen that we have disclosed an improved method and apparatus for the nondestructive testing of structures, in particular pressure vessels, wherein stress waves propagated by imposing a load on a structural flaw in the structure are detected in such a manner as to locate the position of the flaw. In testing pressure vessels for their ability to withstand internal pressures of a given magnitude, the present invention contemplates continually increasing the internal pressure of the pressure vessel until a critical stress-wave signature is transmitted by the stress-wave sensors located thereon to trigger depressurization of the vessel before failure thereof occurs. Such depressurization can be accomplished on the eletcrical signals emitted by the stress-wave sensors in response to a single stress wave propagated by a structural flaw or to a series of such stress waves which accumulatively correspond to the selected critical stress-wave signature for depressurization. Accordingly, the method and apparatus is able to discriminate between stress-wave signatures of different flaw sizes and can be used for testing pressure vessels having walls constructed of different materials. In the case of pressure vessels which are of heterogeneous wall construction, such as the resin-impregnated, filament-wound type, the critical stress-wave signature for each individual type of such pressure vessels must be determined in advance by testing a number of such pressure vessels of the same type to structural failure. This is necessary because of the unique quality and individuality of each type of filament-wound pressure vessel provided by a number of factors, such as the winding pattern employed for the filaments, for example. The critical stress-wave signature for a pressure vessel of the resin-impregnated, filament-wound type takes the form of a sloped line which is indicative of impending structural failure, the sloped line being derived from accumulative stress waves traced on a written record or displayed on the viewing screen of an oscilloscope. For pressure vessels of homogeneous wall construction, such as pressure vessels having metallic walls (as for example, of steel), the critical stress-wave signature characteristically comprises a wave which may be generally described as being "saw-toothed," wherein the maximum amplitude thereof is of a particular magnitude. Generally, the critical stress-wave signature for a pressure vessel of homogeneous wall construction can be determined in advance by applying a progressively increasing tensile load to a test specimen, such as a bar, of the same material having a structural flaw therein until the specimen fails. The stress-wave signals from sensors placed on the test specimen are monitored on an oscilloscope which provides a written record thereof. From this data which includes the appearance of the stress waves immediately prior to the failure of the test specimen, a critical stress-wave signature can be derived for a specific pressure vessel having walls of the same homogeneous material—usually without the necessity for testing a number of pressure vessels of the same type to destruction in order to obtain data for the critical stress-wave signature.

While the forms of the invention herein shown and described are to be taken as preferred embodiments of the same, it will be understood that various changes in the shape, size, and selection of the component parts of the invention may be resorted to without departing from the spirit of the invention which is determined by the scope of the claims.

We claim:
1. A method of testing an article for structural flaws, said method comprising:

securing a plurality of stress-wave sensors to the article at predetermined spaced locations thereon so as to arrange the sensors over a substantial portion of the article, imposing a progressively increasing load on the article, detecting the propagating of stress waves in the article by the sensors as the load imposed on the article increases so as to give off signals from the sensors, and determining from the signals given off by the sensors the location of a flaw in the article responsible for propagating stress waves detected by the sensors.

2. A method of testing a pressure vessel for flaws in the wall thereof, said method comprising:

securing a plurality of stress-wave sensors to the pressure vessel at predetermined spaced locations thereon so as to arrange the sensors over a substantial portion of the pressure vessel, introducing pressure fluid into the pressure vessel to continually increase the internal pressure thereof, detecting the propagation of transient stress waves in the walls of the pressure vessel by the sensors as the internal pressure increases within the pressure vessel so as to give off signals from the sensors indicative of a flaw if stress waves are detected, and discriminating between stress-wave signatures of different flaw sizes, whereby flaws in the walls of the pressure vessel may be detected and located without destruction of said pressure vessel.

3. A method of testing a pressure vessel for flaws in the walls thereof, said method comprising:

securing a plurality of stress-wave sensors to the pressure vessel at predetermined spaced locations thereon so as to arrange the sensors over a substantial portion of the pressure vessel, introducing pressure fluid into the pressure vessel to continually increase the internal pressure thereof, detecting the propagating of stress waves in the walls of the pressure vessel by the sensors as the internal pressure increases within the pressure vessel so as to give off signals from the sensors indicative of a flaw if stress waves are detected, and determining from the signals given off by the sensors the location of a flaw in the walls of the pressure vessel responsible for propagating stress waves detected by the sensors.

4. A method of testing a pressure vessel for flaws in the walls thereof, said method comprising:
   securing a plurality of stress-wave sensors to the pressure vessel at predetermined spaced locations thereon so as to arrange the sensors over a substantial portion of the pressure vessel,
   establishing a critical stress-wave signature for the pressure vessel comprising at least one signal to be given off from the sensors which is indicative of impending structural failure of the pressure vessel,
   introducing pressure fluid into the pressure vessel to continually increase the internal pressure thereof,
   detecting the propagating of stress waves in the walls of the pressure vessel by the sensors as the internal pressure increases within the pressure vessel so as to give off signals from the sensors indicative of a flaw if stress waves are detected, and
   relieving the internal pressure of the pressure vessel when the signals given off by the sensors in detecting stress waves propagated in the walls of the pressure vessel include at least one signal substantially coinciding with the critical stress wave signature for the pressure vessel to prevent destruction of the pressure vessel.

5. A method of testing a pressure vessel for flaws in the walls thereof, said method comprising:
   securing a plurality of stress-wave sensors to the presvessel at predetermined space locations thereon so as to arrange the sensors over a substantial portion of the pressure vessel,
   establishing a critical stress-wave signature for the pressure vessel comprising at least one signal to be given off from the sensors which is indicative of impending structural failure in the pressure vessel,
   introducing pressure fluid into the pressure vessel to continually increase the internal pressure thereof,
   detecting the propagating of stress waves in the walls of the pressure vessel by the sensors as the internal pressure increases within the pressure vessel so as to give off signals from the senosrs indicative of a flaw if stress waves are detected,
   continuously comparing the signals given off by the sensors in detecting stress waves propagated in the walls of the pressure vessel with the critical stress-wave signature for the pressure vessel as the internal pressure of the pressure vessel is being increased, and
   relieving the internal pressure of the pressure vessel when coincidence occurs between the critical stress-wave signature and the signals given off by the sensors to prevent destruction of the pressure vessel.

6. Apparatus for use with an article to detect and locate structural flaws therein comprising
   means for imposing a progressively increasing load on the article,
   plural sensor means adapted to be attached to the article in spaced relationship with respect to each other so as to be disposed over a substantial portion of the article for detecting stress waves propagated by a structural flaw in the article when placed under load, said sensor means emitting signals in response to the detection of stress waves in the article, and
   means receiving the signals emitted from said sensor means and determining the location of the structural flaw in the article therefrom.

7. Apparatus for use with a pressure vessel to detect flaws in the walls thereof comprising
   means for introducing pressure fluid into the pressure vessel to continually increase the internal pressure therewithin, and
   plural sensor means adapted to be attached to the walls of the pressure vessel in spaced relationship with respect to each other so as to be disposed over a substantial portion of the pressure vessel for detecting stress waves propagated by a flaw in the walls of the pressure vessel when subjected to stress imposed by the internal pressure of the pressure vessel, said sensor means emitting signals in response to the detection of stress waves in the walls of the pressure vessel indicative of a flaw in the walls of the pressure vessel.

8. Apparatus for use with a pressure vessel to detect flaws in the walls thereof, comprising:
   means for introducing pressure fluid into the pressure vessel to continually increase the internal pressure therewithin,
   plural sensor means adapted to be attached to the walls of the pressure vessel in spaced relationship with respect to each other so as to be disposed over a substantial portion of the pressure vessel for detecting stress waves propagated by a flaw in the walls of the pressure vessel when subjected to stress imposed by the internal pressure of the pressure vessel, said sensor means emitting a signal in response to the detection of stress waves in the walls of the pressure vessel indicative of a flaw in the walls of the pressure vessel, and
   means receiving the signals emitter from said sensor means and determining the location of the flaw in the walls of the pressure vessel therefrom.

9. Apparatus as defined in claim 8, wherein
   said signal-receiving means comprises a comparator in which a critical stress-wave signature for the pressure vessel is stored,
   said critical stress-wave signature comprising at least one signal corresponding to signals given off by said sensor means and indicative of impending structural failure of the pressure vessel, and
   means operably connected to said comparator for relieving the internal pressure of the pressure vessel and being actuatable in response to coincidence occurring between the critical stress-wave signature stored in said comparator and the actual signals received by said comparator from said sensor means.

10. Apparatus as defined in claim 8, wherein
    said signal-receiving means comprises an oscilloscope having a screen on which signals given off by said sensor means are visually displayed,
    a template affixed to said oscilloscope in overlying relation to the screen and having a critical stress-wave signature formed thereon so as to be superimposed on the screen,
    said critical stress-wave signature comprising at least one signal corresponding to signals given off by said sensor means and indicative of impending structural failure of the pressure vessel, and
    means operable to relieve the internal pressure of the pressure vessel and being actuated when coincidence occurs between the critical stress-wave signature formed on said template and the actual signals from said sensor means which are visually displayed on the screen of said oscilloscope.

11. Apparatus as defined in claim 10, wherein
    said pressure-relieving means includes an actuating means therefor comprising a manually operable switch normally disposed in inoperative position,
    whereby an operator may move the switch to operative position upon observing coincidence between the critical stress-wave signature formed on said template and the actual signals from said sensor means which are visually displayed on the screen of said oscilloscope to actuate said pressure-relieving means.

12. Apparatus as defined in claim 10, wherein
    said pressure-relieving means includes an actuating means therefor comprising a photoelectric cell disposed in alinement with the screen of said oscilloscope, said template being made of opaque material and completely covering the screen of said oscilloscope, the critical stress-wave signature formed on said template being light-transmissive, and said photoelectric cell being energized in response to the reception of light thereby whenever coincidence occurs between the critical stress-wave signature formed on said template and the actual signals from said sensor means which are visually displayed on the screen of said oscilloscope to actuate said pressure-relieving means.

References Cited

UNITED STATES PATENTS

| | | | |
|---|---|---|---|
| 2,397,746 | 4/1946 | Lewis | 181—26X |
| 2,932,002 | 4/1960 | Reiser | 181—26X |
| 3,113,451 | 12/1963 | Beals et al. | 73—67.2 |
| 3,128,628 | 4/1964 | Lebow | 73—88.5X |
| 3,377,841 | 4/1968 | Neal | 73—49.7X |

JERRY W. MYRACLE, Primary Examiner

U.S. Cl. X.R.

73—49.7, 514